(12) United States Patent
Shtraym (10) Patent No.: US 10,318,004 B2
(45) Date of Patent: Jun. 11, 2019

(54) APPARATUS AND METHOD FOR PROVIDING FEEDBACK AT A PREDETERMINED DISTANCE

(71) Applicant: Alex Shtraym, Chicago, IL (US)

(72) Inventor: Alex Shtraym, Chicago, IL (US)

( * ) Notice: Subject to any disclaimer, the term of this patent is extended or adjusted under 35 U.S.C. 154(b) by 353 days.

(21) Appl. No.: 15/196,823

(22) Filed: Jun. 29, 2016

(65) Prior Publication Data
US 2018/0004290 A1    Jan. 4, 2018

(51) Int. Cl.
*G06F 3/01* (2006.01)

(52) U.S. Cl.
CPC .............. *G06F 3/016* (2013.01); *G06F 3/011* (2013.01); *G06F 3/014* (2013.01); *G06F 3/017* (2013.01); *G06F 2203/013* (2013.01); *G06F 2203/0384* (2013.01)

(58) Field of Classification Search
USPC ......................................................... 345/156
See application file for complete search history.

(56) References Cited

U.S. PATENT DOCUMENTS

| | | | |
|---|---|---|---|
| 6,366,272 B1 | 4/2002 | Rosenberg | |
| 7,158,112 B2 | 1/2007 | Rosenberg | |
| 8,316,166 B2 | 11/2012 | Grant | |
| 8,519,950 B2* | 8/2013 | Radivojevic | G06F 3/014 |
| | | | 345/156 |
| 9,158,377 B2 | 10/2015 | Shinozaki | |
| 2007/0290988 A1* | 12/2007 | Nogami | G06F 3/016 |
| | | | 345/156 |
| 2008/0094351 A1* | 4/2008 | Nogami | G06F 3/016 |
| | | | 345/156 |
| 2008/0100588 A1* | 5/2008 | Nogami | G06F 3/016 |
| | | | 345/173 |
| 2008/0283024 A1* | 11/2008 | Gregorio | F02D 11/105 |
| | | | 123/399 |
| 2009/0303175 A1* | 12/2009 | Koivunen | A63F 13/10 |
| | | | 345/156 |
| 2010/0134327 A1 | 6/2010 | Dinh et al. | |
| 2012/0182135 A1* | 7/2012 | Kusuura | G06F 3/00 |
| | | | 340/407.1 |
| 2014/0368601 A1* | 12/2014 | deCharms | H04W 4/021 |
| | | | 348/14.02 |
| 2015/0293592 A1* | 10/2015 | Cheong | G06F 3/016 |
| | | | 345/173 |
| 2016/0004313 A1* | 1/2016 | Ryu | G06F 3/016 |
| | | | 715/702 |
| 2016/0054797 A1* | 2/2016 | Tokubo | G06F 3/012 |
| | | | 345/633 |
| 2016/0274662 A1* | 9/2016 | Rimon | G06F 3/014 |
| 2016/0342207 A1* | 11/2016 | Beran | G06F 3/011 |

(Continued)

*Primary Examiner* — Jason C Olson
(74) *Attorney, Agent, or Firm* — Alex Shtraym (57) ABSTRACT

A haptic device is configured to obtain a predetermined distance and establish a contact position. The haptic device may monitor sensor data in order to determine an activity using a content module and access a lookup table to associate a contact position with the determined activity. A position module will monitor the position of the haptic device and detect when the haptic device is at the contact position. At the contact position, the haptic device will produce a haptic effect. In some embodiments, a display device may be in communication with the haptic device in order to transmit and receive data.

20 Claims, 7 Drawing Sheets

(56) References Cited

U.S. PATENT DOCUMENTS

2016/0363997 A1* 12/2016 Black .................. G06F 3/014
2017/0011210 A1* 1/2017 Cheong ................ H04W 12/06
2017/0168576 A1* 6/2017 Keller .................. G06F 3/016
2018/0001192 A1* 1/2018 Vaughn ................ A63F 13/285

* cited by examiner

APPARATUS AND METHOD FOR PROVIDING FEEDBACK AT A PREDETERMINED DISTANCE

FIELD OF THE DISCLOSURE

The present disclosure relates generally to a device that is configured to produce feedback based on a detected position of a device.

BACKGROUND

Mobile devices are constantly being implemented into everyday activities in order to efficiently accomplish tasks. Most current mobile and wearable devices are capable of providing feedback that was only possible with heavy or stationary equipment in the past. Haptic feedback has played a large role in recent years in terms of communicating information to users via mobile and wearable devices. Typically, actuators are mounted in a housing and create a range of vibration frequencies and magnitudes that can be conveyed to a user in order to communicate an incoming call or message.

Haptics is usually associated with transmission or reception of information from one device to another. However, the ability to provide feedback has many applications to other actions that are achieved by a user without the need of multiple devices or networks. Activities that commonly require a user to reach or touch something are accomplished when one hits a certain distance. For example, a boxer may hit a punching bag or a person doing yoga may need to have a body part in a specific position. Unfortunately, such activities usually require bulky equipment or are done incorrectly because no feedback is given on proper form.

DETAILED DESCRIPTION

Briefly, a disclosed haptic device obtains a predetermined distance relevant to its initial position. The initial position of the haptic device may be determined by a position module or obtained from a received input signal. A lookup table is accessed to determine the distance from the initial position of the haptic device. The predetermined distance may be determined based on an activity monitored by a content module. A position at the determined distance is designated as a contact position while sensors monitor the position of the haptic device as a user moves. The haptic device is configured to detect when its position is at the contact position and provide a haptic effect as feedback to the user that the haptic device is at the contact position.

One aspect of the present disclosure is a method that includes obtaining a predetermined distance to a first device. The first device will, using sensors, monitor its position. The first device will detect its position to be at a contact position, wherein the contact position is the position of the first device corresponding to the predetermined distance based on an initial position of the first device. At the contact position the first device will provide a haptic effect. The first device may obtain its initial position from sensors.

In one embodiment, the first device may receive an input signal associated with the initial position of the first device. In response to the initial position, the first device may determine the predetermined distance corresponding to the initial position of the first device based on a lookup table value. The first device is capable of outputting a control signal associated with the contact position to an actuator coupled to the first device, the control signal is configured to cause the actor to output the haptic effect. In one embodiment, the first device may adjust the control signal corresponding to the predetermined distance, thereby changing a haptic strength. An adjusted control signal will produce a different haptic effect from the original control signal.

In another aspect of the present disclosure, a second device may display an object at a virtual position. The virtual position may be a position corresponding to the predetermined distance between the first device and the contact position on a display. The second device may also display the first device as an object.

In another aspect of the present disclosure, a system includes a first wearable device having at least one unit, whereby each unit comprises a sensor, an actuator and a transceiver for transmitting and receiving information. The first wearable device includes a first non-volatile, non-transitory computer program product programmed to obtain an initial position of the first device. After obtaining the initial position, the computer program product of the first wearable device will determine a predetermined distance and detect a contact position. The contact position corresponds to a position of the first wearable device to the predetermined distance. At the contact position the computer program product will provide a control signal to the actuator to produce a haptic effect.

The system further includes a second device having an optical display unit configured to provide a virtual or augmented reality interface and display an object at the contact position. A second non-volatile, non-transitory computer program product of the second wearable device is programmed to receive information from the first wearable device and display visual content on a display. The visual content may be one or more computer generated objects.

In one embodiment of the system, a sensor is configured to detect the initial position of the first wearable device. The first computer program product may be programmed to obtain an initial position based on an input signal.

In another embodiment, the second device may be a head-mounted display. The second computer program product may be programmed to display the first wearable device and display an object at a virtual position corresponding to an input signal. The virtual position is a distance between the first wearable device and the object on a display corresponding to the predetermined distance between the first wearable device and the contact position. In yet another embodiment, the second computer program product may display the first wearable device as an object based on information received from the first wearable device and display a second object at the virtual position corresponding to the object associated with the first device.

In yet another aspect of the present disclosure, a wearable device includes an actuator, non-volatile, non-transitory memory coupled to an actuator and a processor coupled to the actuator and non-transitory, non-volatile memory. The processor is operative to obtain a predetermined distance to the wearable device and monitor a position of the wearable device. The processor will detect the wearable device at a contact position, where the contact position is a position of the wearable device corresponding to the predetermined distance based on the initial position of the wearable device and generate a haptic effect at the contact position.

In one embodiment, the wearable device further includes a sensor from which the processor can obtain information to determine the initial position of the wearable device. The processor may further receive an input signal associated with the initial position of the wearable device. In another embodiment, the processor is operative to determine the predetermined distance corresponding to the wearable device based on a lookup table stored in the memory. The lookup table may have a plurality of initial position entries, wherein each entry corresponds to a distance.

In yet another embodiment, the processor is further operative to output a control signal associated with the contact position to the actuator, the control signal is configured to cause the actuator to produce the haptic effect. The process may adjust the control signal in order to produce different haptic effects.

In another aspect of the present disclosure, the wearable device includes a transceiver that is operatively coupled to the processor. The processor is operative to wirelessly connect with a display device, wherein the display device is operative to display an object at a virtual position. The virtual position may be a position on a display corresponding to the predetermined distance between the wearable device and the contact position. The display device is further operative to display the wearable device as an object on the display.

Figure 1:
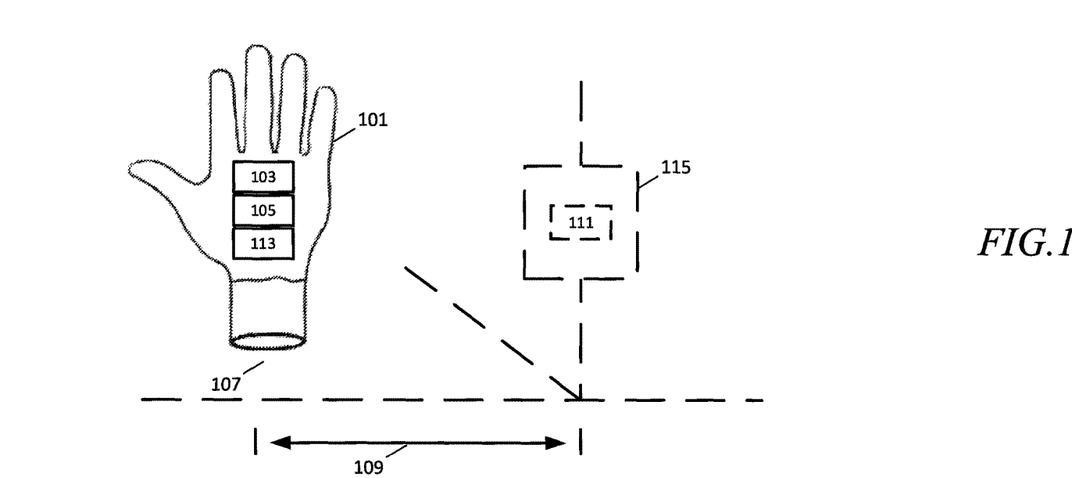
FIG. 1 is a diagram of a device with a position module in accordance with an embodiment.

Turning now to the drawings, FIG. 1 is a diagram of a haptic device 101 with a position module 103 in accordance with an embodiment. The haptic device 101 may be any suitable electronic device such as a mobile or wearable device. The haptic device 101 may also incorporate flexible components that enable the haptic device 101 to conform to a given contour, such as a glove, bracelet, watch, anklet and the like.

In various embodiments, the haptic device 101 has a position module 103 configured to obtain an initial position 107 of the haptic device 101 in a two or three dimensional space using a variety of sensors 105, such as a gyroscope, accelerometer or the like. In some embodiments, sensor data may be transmitted to the position module from an external device. Once an initial position 107 of the haptic device 101 is obtained, the position module 103 is capable of obtaining a predetermined distance 109 based on the collected sensor data of the haptic device 101 at its initial position 107. Sensor data will provide the position module 103 with informational parameters to establish a proper predetermined distance 109. Such sensor data may include, but is not limited to, a location, an orientation and a height of the haptic device 101 relative to a ground level. The collected sensor data of the haptic device's initial position 107 will be matched to a lookup table entry in a memory of the haptic device 101 which will have a corresponding distance value.

In some embodiments, movement of the haptic device 101 before the initial position 107 is identified is continuously monitored by sensors 105. A content module 113 in the haptic device 101 will collected the sensor data in order to determine an activity. For instance, the content module 113 determines that the haptic device 101 moved in a circle before the initial position 107 was obtained. The content module 113 will determine that the circular motion corresponds to an activity and then the position module 103 will establish an initial position 107. The position module 103 may factor in the determination of the content module 113 in order to determine an appropriate predetermined distance 109 and contact position 111. In some embodiments, the content module 113 may have a number of predefined activities corresponding to motions or is capable of recording a motion and assigning it to an activity. Activities can be any suitable activity that generate feedback such as, but not limited to, an athletic activity (e.g. hitting a boxing bag), an input on a device (e.g. touching a touchscreen, button, etc.), and alerts (e.g. movement outside a designated area). For example, the content module 113 may determine from sensor data that feedback should be given when a person is outside a zone and the position module 103 establishes a contact position based on an appropriate predetermined distance such that when the haptic device 107 reaches that contact position (i.e. zone boundaries) feedback will be given to the user.

In another embodiment, the haptic device 101 may be in communication (wired or wireless) with a second device to obtain or receive at least one predetermined distance 109 value from the second device based on the initial position 107 of the haptic device 101. The haptic device 101 may contain several lookup tables in memory with different corresponding predetermined distance 109 values based on a number of parameters, such as a user input, an activity, etc. A lookup table is one possible format of distance data that is determined or obtained by the position module 103 of the haptic device 101.

Once a predetermined distance 109 value is identified by the position module 103, the haptic device 101 may communicate the predetermined distance 109 to a user via an audible sound, visible light or any combination thereof and the like. Likewise, the haptic device 101 may transmit the information to a second device capable of communicating the predetermined distance 109 value (e.g. audibly) or displaying, on the second device, a virtual object 115 at a distance relative to the position of the haptic device 101.

In some embodiments, the haptic device 101 may include more than one initial position 107 due to its shape or use. For instance, the haptic device 101 may be a glove that a user wears to interact with the environment. The glove may include sensors 105 at the palm, at each fingertip, etc. Therefore, if the glove was used to type on a virtual keyboard, each finger will have an initial position 107 and a corresponding contact position 111. The position module 103 may establish a variety of contact positions for the haptic device 101 as a whole, or may establish different contact positions for different portions of the haptic device 101.

In the illustrative example of FIG. 1, haptic device 101 is a "smart glove" at a determined initial position 107 based on a three dimensional grid and a contact position 111 has been established by the position module 103. In some embodiments, once the position module 103 has obtained the predetermined distance 109 from the initial position 107 of the haptic device 101, a user may freely move the haptic device 101 without any change to the contact position 111.

For instance, the haptic device 101 may determine a similar initial position 107 for two users wearing the haptic device 101 and thereby a similar contact position 111, however, a first user may have a long reach and require a different contact position 111 as compared to a second user with a shorter reach if the haptic device 101 is being used to simulate a boxing glove and the predetermined distance 109 from the haptic device 101 would be the distance to a simulated boxing bag. Therefore, the second user would need to move the haptic device 101, without changing the contact position 111, in order to reduce the predetermined distance 109 and successfully reach the simulated boxing bag. The predetermined distance 109 from the initial position 107 of the haptic device 101 may remain unchanged as the user moves with the haptic device 101, unless otherwise instructed.

In various embodiments, the location module 103 is constantly monitoring sensor data and changing the contact position 111 based on the predetermined distance 109 as the position of the haptic device 101 changes. For example, the haptic device 101 may be a smart glove, in communication with a device (e.g. tablet computer), and simulate a keyboard input when a contact position is reached by a fingertip of the glove, wherein each keyboard input retains a constant predetermined distance from the haptic device 101. In other words, a "virtual keyboard" is represented at a predetermined distance from a portion (e.g. palm) of the haptic device 101 such that if a user were to move the haptic device 101 from a vertical position to a horizontal position, the haptic device 101 would continuously update the positioning of the virtual keyboard and provide a haptic feedback if it were to detect the position of a fingertip of the haptic device 101 to be that of the contact position of the keyboard input.

In one embodiment, the position module 103 may establish a perimeter around the initial position 107 of the haptic device 101 based on the predetermined distance 109 value from the lookup table, wherein the perimeter will resemble the contact position 111. In other words, the contact position 111 will be at the predetermined distance 109 in every direction from the haptic device 101. In other words, the contact position 111 would be the same distance whether the haptic device 101 were to be moved forwards or backwards, thereby capable of providing a feedback at multiple locations.

In another embodiment, the position module 103 may obtain a plurality of predetermined distance 109 values that are available and establish each predetermined distance 109 value as a contact position 111 from the initial position 107 of the haptic device 101. In yet another embodiment, the position module 103 may obtain predetermined distance 109 values that are accompanied by angles based on the orientation of the haptic device 101. For example, the position module 103 may establish a predetermined distance of 1 foot and a contact position may be established at 90 degrees and another contact position at 45 degrees relative to the initial location of the haptic device 101. If the haptic device 101 were to be positioned at the distance of 1 foot at any other angle, no feedback would be provided. One example of this may include a virtual application window that a user may navigate through using the haptic device 101. Each corresponding action of the virtual application window will be a certain angle and distance from the initial position of the haptic device 101. Thus, if a user wants to select an application action, such as one regularly done by using a peripheral device (computer mouse), the haptic device 101 would need to be moved by that predetermined distance and angle (i.e. the established contact position). Accordingly, the haptic device 101 will provide feedback only if the position module 103 detects the haptic device 101 at a contact position 111.

As the haptic device 101 moves, sensors 105 will monitor the movement and continuously determine the position and orientation of the haptic device 101. No feedback will be produced by the haptic device 101 until the haptic device 101, or a designated portion thereof, reaches a contact position 111. Therefore, if the haptic device 101 is not detected to be at the contact position 111, no feedback will be given to a user.

Figure 2:
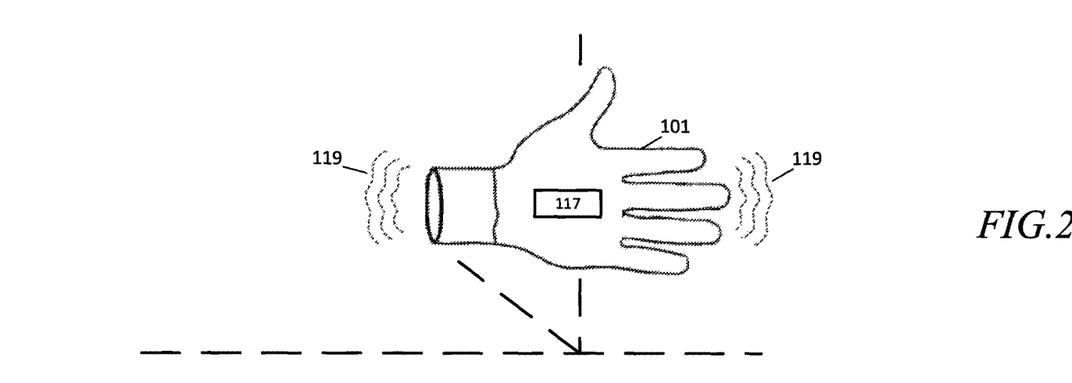
FIG. 2 is a diagram of a device with a haptic module to provide a haptic effect in accordance with an embodiment.

FIG. 2 is a diagram of the haptic device 101 with a haptic module 117 to provide feedback in accordance with various embodiment. In one embodiments, the haptic device 101 is configured to provide a haptic effect 119 to at least a portion of the haptic device 101, which can be conveyed to a user in contact with the haptic device 101. The haptic module 117 may be used to enhance the user experience when performing a variety of activities or instruct the user of a completed task. The haptic effect 119 can be created with any of the methods of creating haptics, such as, but not limited to electrostatic, vibration, deformation, kinesthetic sensation, or ultrasonic friction. In an embodiment, the haptic module 117 send a control signal to an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a material such as piezoelectric materials, electro-active polymers or shape memory alloys, a macro-composite fiber actuator, an electro-static actuator, an electro-tactile actuator, and/or another type of actuator that provides a physical feedback such as a haptic feedback. The haptic device 101 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as an air jet, visual image, and so on.

In various embodiment, multiple haptic output devices may be used to produce different haptic effects by converting electronic signals into feedback that is felt or heard by a user. The strength or duration of the haptic effect 119 may vary depending on a number of parameters such as the speed of the haptic device 101. Speed may be measured by sensors 105 in the haptic device 101 or obtained from a second device in communication with the haptic device 101. For example, a sensor may monitor the position of the haptic device 101 and detect the position of the haptic device 101 to be that of the contact position 111, at which point, the haptic module 117 will dynamically calculate a speed as a ratio of distance over time and output a haptic effect 119 of corresponding strength. The haptic module may access a lookup table, stored in memory, to obtain a strength matching the determined speed. For example, if the haptic module 117 were to determine a high speed at a contact position, the strength of the vibration would be greater than that of a haptic device 101 moving at a lower speed. Varying haptic effects 119 may be stored in a memory of the haptic device 101. This is understood to be just one exemplary illustration of the haptic device 101.

Figure 3:
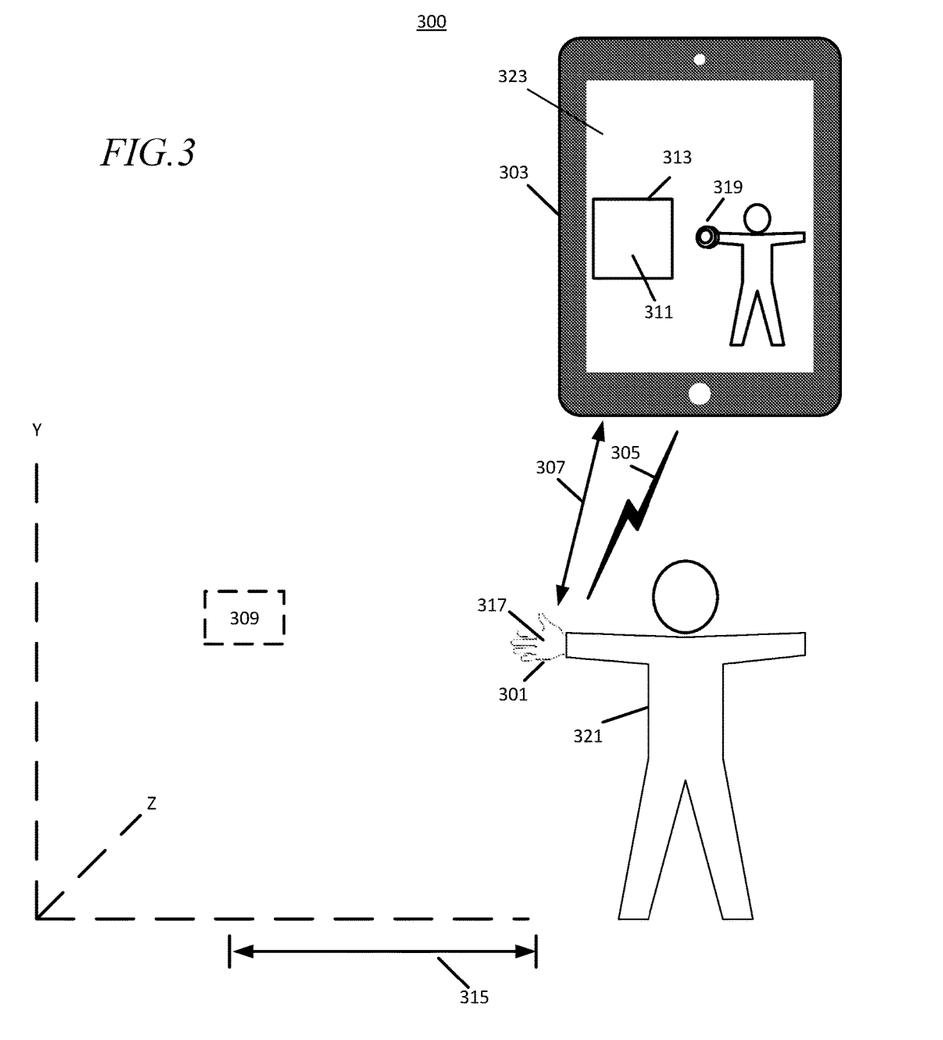
FIG. 3 is a diagram of a haptic device operative to connect with a display device using a low energy wireless protocol in order to obtain or transmit position information.

FIG. 3 shows a system 300 including a haptic device 301 that is operative to communicate with a display device 303 in accordance with various embodiments. The display device 303 may be any suitable electronic device having a display 323. The term "display" as used herein refers to a device that displays an image or images, such as, but not limited to, a virtual object, a computer desktop, a gaming background, a video, an application window etc. For example, the display device 303 can be a laptop, tablet computer, phone, monitor, head display unit, virtual reality or augmented reality display device and the like, and devices combining some or all of this functionality. The haptic device 301 is operative to communicate with the display device 303 using wireless technologies such as, but not limited to, WiFi®, Bluetooth®, Wireless USB, ZigBee, or any other suitable wireless technology that may form the wireless link 305 between the haptic device 301 and the display device 303 to transfer information or commands 307 and controlling signaling there-between.

In some embodiments, the display device 303 may be at a fixed location. The haptic device 301 and the display device 303 may go through a pairing procedure or a connection procedure depending on the wireless technology employed. The haptic device 301 and display device 303 communicate in order to exchange information or commands 307 such as position, visual content, user inputs etc. The content module 113 of the haptic device 301 may be configured to communicate data on the display device 303 in a visually readable form (i.e. images). The display device 303 may be able to determine a virtual position 311 that is a position on the display 323 that corresponds to the predetermined distance 315 between the haptic device 301 and the contact position 309. In other words, the images displayed on display 323 to resemble the above mentioned elements may be relative in distance.

For example, a content module may determine that a user has chosen to do jumping jacks, which require a predetermined distance from an initial position. As such, the haptic device 301 will send information from the content module to a display device 303 so that the contact position 309 may be represented by an object 313 at a virtual position 311 corresponding to jumping jacks on a display 323. In one embodiment, the haptic device 301 is capable of receiving information and commands 307 such as content and location data, over the wireless link 305, from the display device 303. The display device 303 is also capable of adjusting the information received from the haptic device 301 in order to display the data in a user understandable format (e.g. text or images).

In the illustrative example of FIG. 3, haptic device 301 will communicate the location and content data to the display device 303 and the display device 303 will display, on display 323, the object 313 according to a content module of the haptic device 301. For example, the haptic device 301 may be a "smart glove" and the content module determines that a user 321 has selected a boxing simulation. The display device 303 will display the haptic device 301 as a device object 319, herein a boxing glove, and an object 313 in the form of a boxing bag will be displayed at the corresponding virtual position 311 on the display device 303. As the haptic device 301 moves, the display device 303 will receive data from the haptic device 301 so as to display corresponding motions on the display 323. The haptic device 301 will provide a haptic effect at the contact position 309. Display 323 of the display device 303 may display a corresponding movement to the haptic effect. In some embodiments, the content module 113 may provide a corresponding motion for the device object 319 and object 313 displayed on the display device 303 at the virtual position 311 when the haptic device 301 provides a haptic effect 119.

Figure 4:
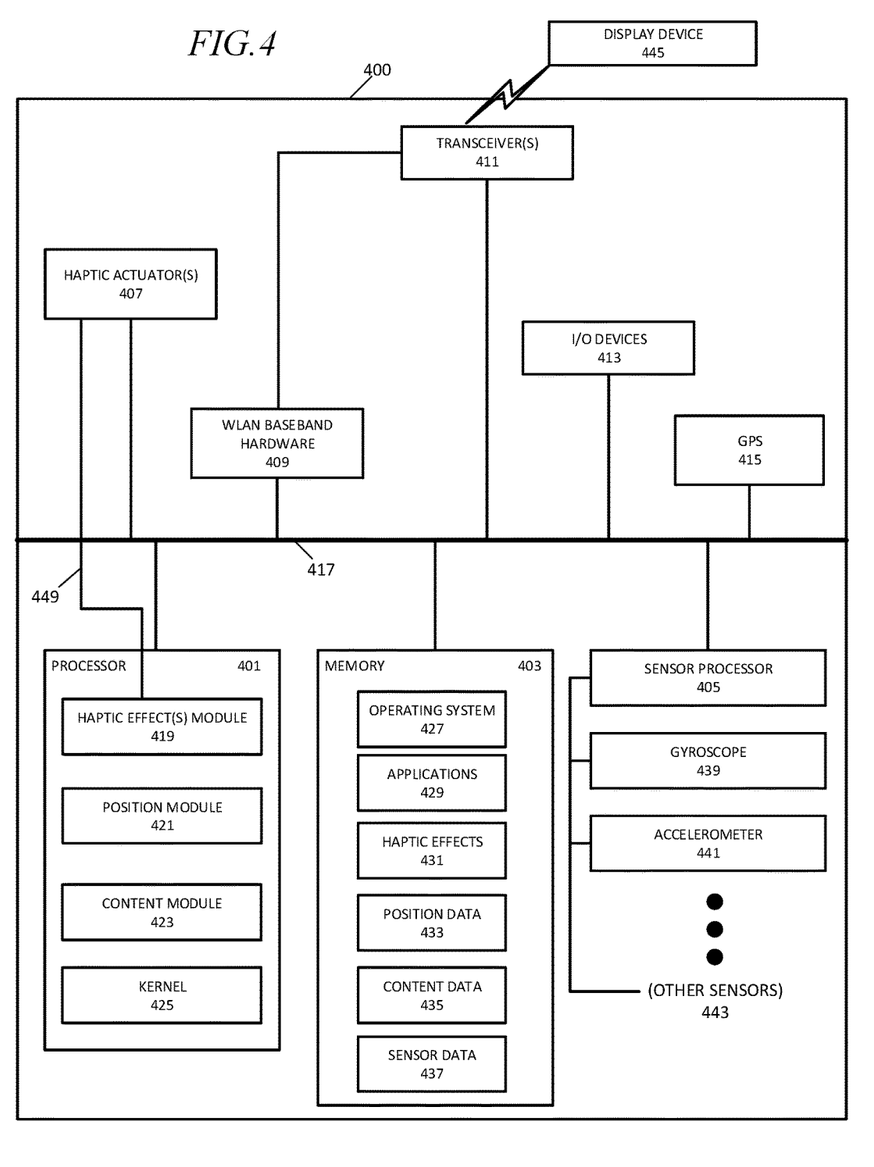
FIG. 4 is a diagram of a haptic device in accordance with an embodiment.

FIG. 4 is a diagram of a haptic device 400 in accordance with various embodiments. The haptic device 400 includes at least one processor 401, WLAN baseband hardware 409, one or more transceivers 411, GPS hardware 415, input/output devices 413, non-volatile, non-transitory memory 403, one or more haptic actuators 407, and a sensor processor 405.

The one or more haptic actuators 407 may include one or more vibrating plates that may transfer vibrations generated in the haptic actuator 407 to the haptic device 400 and vibrate at least a portion of the haptic device 400 through the direct attachment of the haptic actuator 407 to the haptic device 400. However, the vibrating plate may be optionally used in order to mitigate the impact of the vibrations or to amplify the vibrations. The thickness of the vibrating plate may be changed in consideration of the interaction between the haptic device 400 and haptic actuator 407.

All of the haptic device 400 components shown are operatively coupled to the processor 401 by one or more internal communication buses 417. In the example embodiment illustrated in FIG. 4, the processor 401 runs the position module 421, haptic effects module 419, content module 423 and a kernel 425. In some embodiments, a sensor processor 405 monitors and stores in memory 403 sensor data 437 from various sensors including a gyroscope 439 and an accelerometer 441 (which may be separate or integrated in a single package) as well as other sensors 443 such as, but not limited to, temperature sensors, altitude sensors, motion sensors, position sensors, and other sensors capable of determining the physical position of the haptic device 400. For example, the accelerometer 441 may indicate the general orientation of the haptic device 400. By providing data from the accelerometer 441 to the position module 421 in addition to data from other sensors 443, the position module 421 may combine the data and determine positional information with the other sensors 443. The GPS 415 may indicate the position of the haptic device 400 with respect to the latitude and longitude coordinates of the Earth as determined by signals from a plurality of geosynchronous satellites orbiting the earth. The position module 421 may further incorporate the GPS 415 information with the other sensor 443 readings to provide the most accurate positional information. A lookup table may be integrated into the position module 421 or may be stored in the non-volatile, non-transitory memory 403.

The memory 403 is non-volatile and non-transitory and stores executable code for an operating system 427 that may, when executed by the processor 401, provide an application layer, libraries and a kernel 425. The memory 403 also stores executable code for various applications 429, such as haptic effects 431, position data 433, content data 435 and sensor data 437. The processor 401 is operative to, among other things, launch and execute the operating system 427, applications 429, content module 423 and the haptic effects module 419.

The processor 401 also runs the haptic effects module 419 which is operatively connected over an interface 449 to one or more haptic actuators 407. Based on the position data 433, sensor data 437 and position module 421, the processor 401, operatively coupled to the haptic effects module 419, is operative to send a controlled signal to the one or more haptic actuators 407. The processor 401, operatively coupled to the transceiver 411, executes the content module 423 which determines an activity and content the haptic device 400 will transmit to other devices, such as display device 445.

In some embodiments, the haptic device 400 may include one or more input/output devices 413. The input/output devices 413 may be arranged to provide functionality to the haptic device 400 including, but not limited to, capturing images, exchanging information, capturing or reproducing multimedia information, receiving user feedback, or any other suitable functionality. Non-limiting examples of input/output devices include a bar code reader, buttons, switches, input/output ports, and a camera. The embodiments are not limited in this respect.

In some embodiments, the haptic device 400 may include one or more wireless transceivers 411. Each of the wireless transceivers 411 may be implemented as physical wireless adapters or virtual wireless adapters. A single physical wireless adapter may be virtualized using software into multiple virtual wireless adapters. A physical wireless adapter typically connects to a hardware-based access point. A virtual wireless adapter typically connects to a software based wireless access point. For example, a virtual wireless adapter may allow ad hoc communications between peer devices such as a smart phone, smart T.V., laptop or augmented reality headset. Various embodiments may use a single physical wireless adapter implemented as multiple wireless adapters, multiple physical wireless adapters, multiple physical wireless adapters each implemented as multiple virtual wireless adapters or a combination thereof.

The wireless transceivers 411 may comprise or implement various communication techniques to allow the haptic device 400 to communicate with a display device 445 or other electronic devices. For example, the wireless transceivers 411 may implement various types of standard communication elements designed to be interoperable with a network, such as one or more communications interfaces, network interfaces, network interface cards, radios, wireless transceivers, wireless communication media, physical connectors etc. Examples of communications may include, cables, fiber optics, propagated signals, radio frequency, infrared and other wireless media.

In various embodiments, the haptic device 400 may implement different types of wireless transceivers 411. Each wireless transceiver may implement or utilize a same or different set of communication parameters to communicate information between the display device 445 or other various devices. Examples of communication parameters may include a communication protocol, a communication standard, a radio-frequency band, a radio, a transceiver, a radio processor, an access point parameter, modulation and coding scheme, media access control layer parameter, physical layer parameter and any other communication parameter affecting operations for the wireless transceivers 411.

In various embodiments, the wireless transceivers 411 may implement different communication parameters offering varying bandwidths, communication speeds or transmission range. In another embodiment, the wireless transceiver 411 may comprise WLAN baseband hardware 409 designated to communicate information over a wireless local area network (WLAN). Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

Although not shown, the haptic device 400 may further include one or more device resources commonly implemented for electrical and wearable devices, such as various computing and communications platform hardware and software components typically implemented by a personal electronic device. Such device resources may be used in the collection of data to be used by the position module 421, haptic effect module 419 or content module 423. Some examples of device resources may include, without limiting, a co-processor, graphics processing unit, a chipset platform control hub, display electronics, display backlight, network interfaces, location devices, sensors (eg. proximity, pressure, biometric, thermal, environmental, etc.), portable power supplies, application programs, system programs and the like.

The memory 403 may be operatively coupled to the processor 401 via the internal communications buses 417 as shown, may be integrated with, or distributed between one or more processors, or may be some combination of operatively coupled memory and integrated memory. The memory 403 may be any suitable non-volatile, non-transitory memory that may be used to load executable instruction or program code to a processor or other device such as those that may benefit from the features of the herein described embodiments. Furthermore, it is to be understood that any of the above described example components in the example haptics device 400, without limitation, may be implemented as software (i.e. executable instructions or executable code) or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. In embodiments in which one or more of these components is implemented as software, or partially in software/firmware, the executable instructions may be stored in the operatively coupled, non-volatile, non-transitory memory 403, and may be accessed by the processor 401, or other processors, as needed. The non-volatile, non-transitory memory 403 may be part of a computer program product, and is loaded into or written on the haptic device 400 via a removable storage drive, hard drive, or communications interface. The software described herein need not reside on the same or a singular medium in order to perform the inventions described herein.

Figure 5:
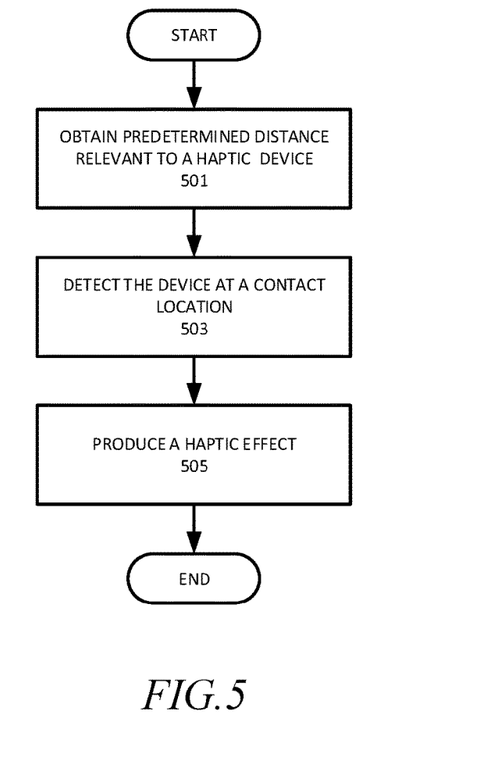
FIG. 5 is a flowchart of a method of operation of a haptic device in accordance with an embodiment.

The flowchart of FIG. 5 shows a method of operation of the haptic device 400 in accordance with the various embodiment. The method of operation begins and at operation block 501, the position module 421 obtains a predetermined distance from the haptic device 400. In some embodiments, the haptic device 400 may determine the predetermined distance using sensor data 437. In operation block 503, the position module 421 monitors the position of the haptic device 400 and detects the position to be at a contact position. In operation block 505, the haptic device 400 provides a haptic effect. The haptic effect may be a vibration caused by an electrical signal sent to the one or more haptic actuators 407 operatively coupled to the haptic device 400.

Figure 6:
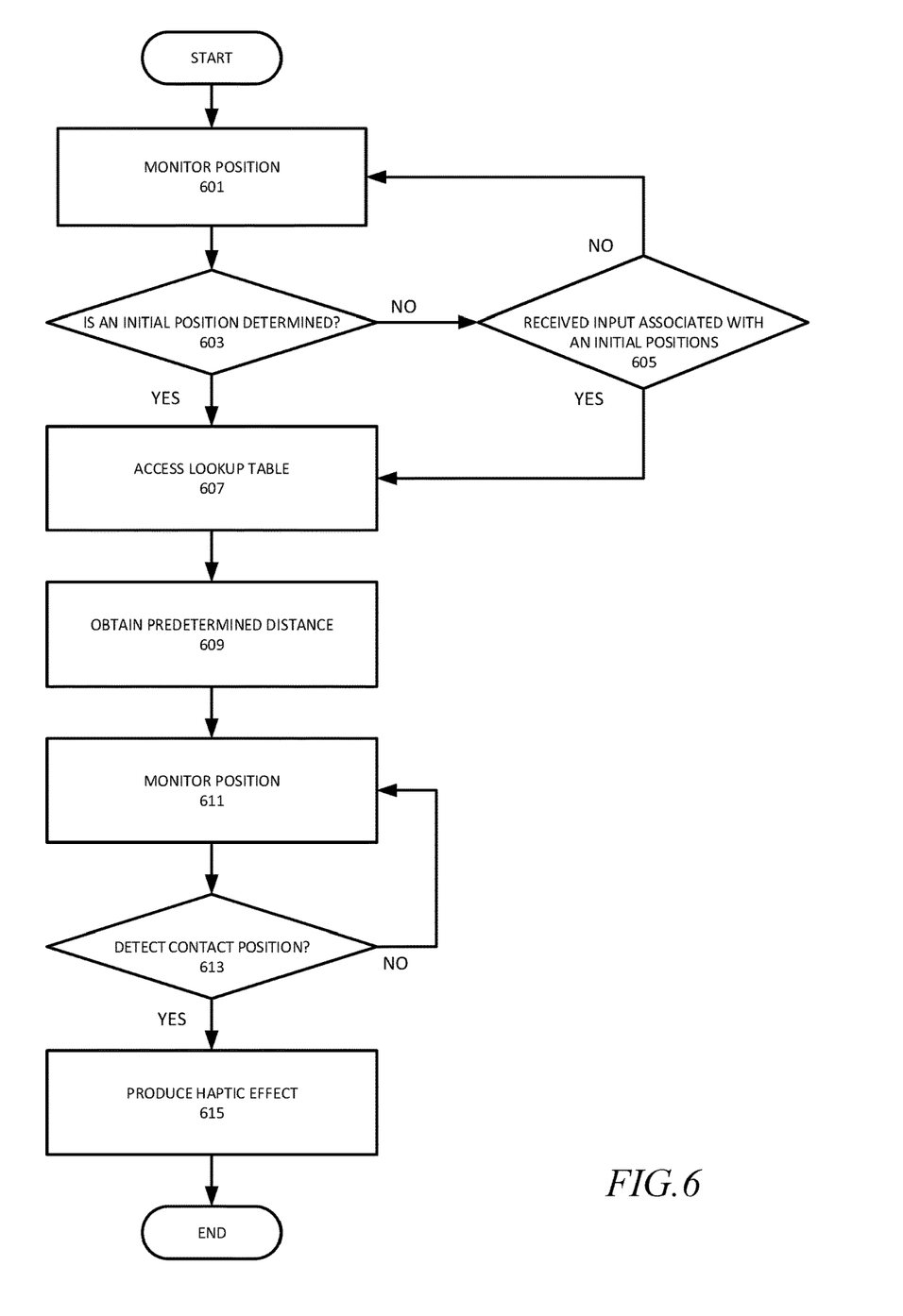
FIG. 6 is a flowchart of a method of operation of a haptic device in accordance with an embodiment.

FIG. 6, is a flowchart of another method in the haptic device 400 in accordance with various embodiment. The method of operation begins and in operation block 601, the position module 421 monitors the position of the haptic device 400 using sensor data from a plurality of sensors. In decision block 603, the position module 421 determines whether an initial position is available. If no initial position is determined, in decision block 605, the haptic device 400 determines whether it has received an input signal associated with an initial position. An input signal may be from an external device sending an initial position or may be sensor data from an external device which the position module 421 can decode to determine the initial position. If no input signal is received with an initial position, the method reverts back to operation block 601 and the position module 421 monitors the sensor data from sensors of the haptic device 400. If an initial position is determined or received, in operation block 607, the position module 421 accesses a lookup table, which may be stored in memory 403. In operation block 609, the position module 421 obtains a predetermined distance from its initial position. In operation block 611, the position module 421 continues to monitor the position of the haptic device 400 and may perform calculations to determine a speed of the haptic device. In decision block 613, the position module 421 determines whether the position of the haptic device 400 is that of a contact position. If not, the position module 421 continues to monitor the position of the haptic device 400. If the position of the haptic device 400 is that of the contact position, in operation block 615, the processor 401 sends and electric signal to haptic actuator 407 in order to provides a haptic effect to haptic device 400.

Figure 7:
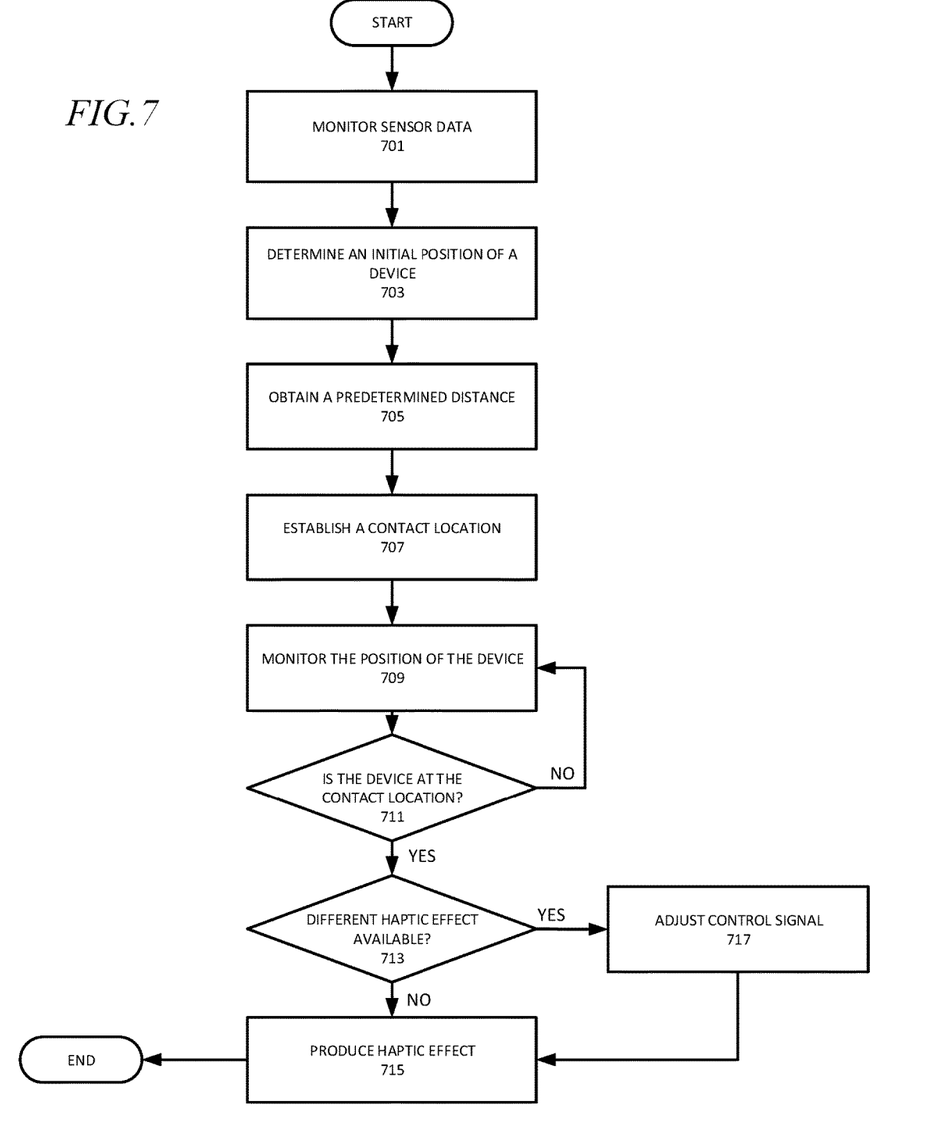
FIG. 7 is a flowchart of a method of operation of a haptic device in accordance with an embodiment.

FIG. 7, is a flowchart of another method of operation in a haptic device 400 in accordance with an embodiment. The method of operation begins and in operation block 701, the position module 421 monitors sensor data 437. In operation block 703, the position module 421 determines an initial position of the haptic device 400. In operation block 705, the position module 421 obtains a predetermined distance. The predetermined distance may be obtained from a lookup table integrated with the position module 421 or from a lookup table stored in memory 403. In operation block 707, the position module 421 establishes a contact position at the predetermined distance from the initial position of the haptic device 400. In operation block 709, the position module 421 monitors sensor data to determine the position of the haptic device 400. In decision block 711, the position module 421 determines if the haptic device 400 is at the contact position. If not, the method reverts back to operation block 709, the position module 421 monitors the position of the haptic device 400. If at decision block 711, the haptic device 400 is at the contact position, in decision block 713, a haptic effects module 419 will determine if different haptic effects are available. If not, in operation block 715, the one or more haptic actuators 407 provides a haptic effect. If in decision block 713, different haptic effects are available, in operation block 717, the haptic effects module 419 will adjust a control signal to be sent to the one or more haptic actuator 407. In operation block 715, the one or more haptic actuators 407 will provide a haptic effect.

Figure 8:
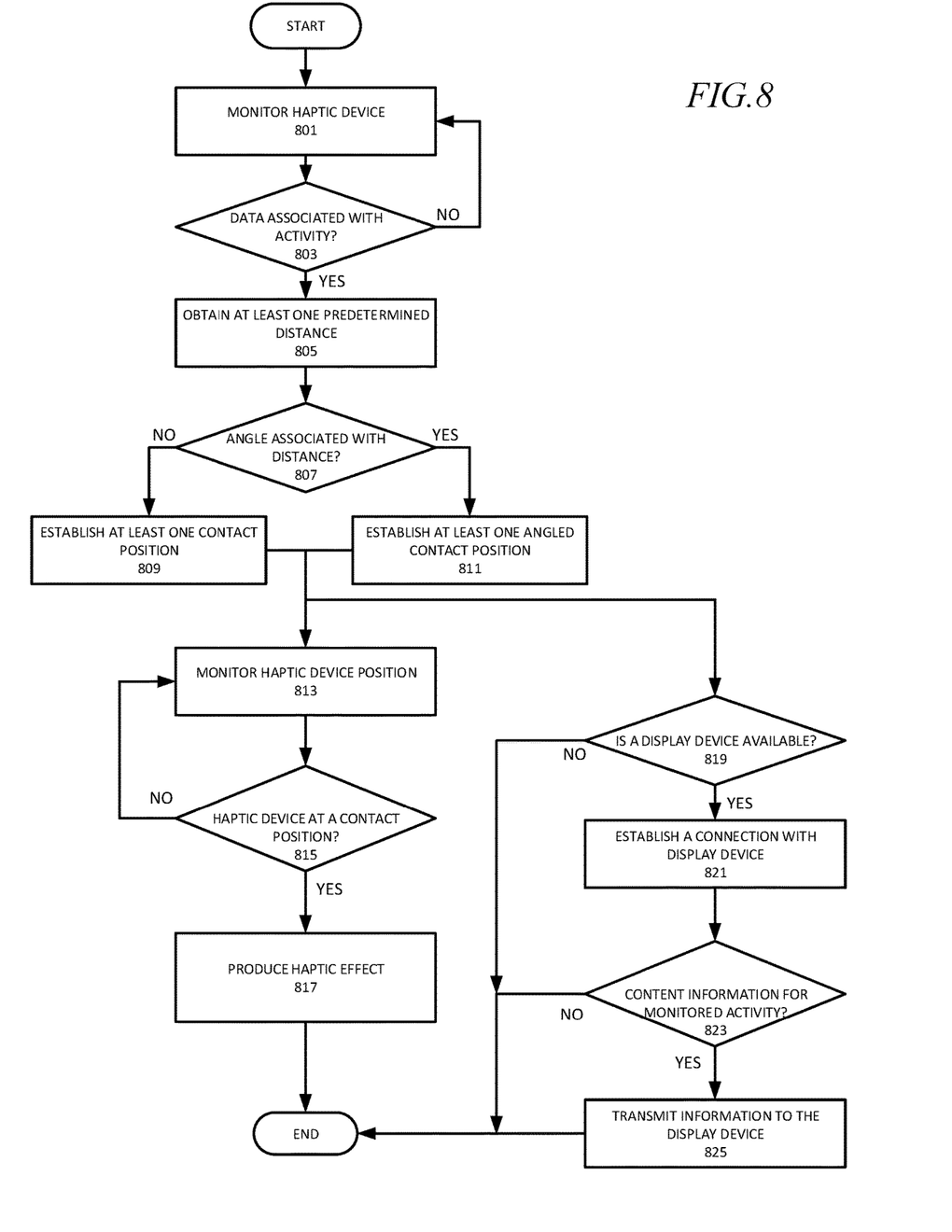
FIG. 8 is a flowchart of a method of operation of a haptic device in accordance with an embodiment.

FIG. 8, is a flowchart of a method of operation in a haptic device 400 in accordance with an embodiment. The operation begins and operation block 801, The sensor processor 405 monitor the haptic device 400. In decision block 803, the content module 423 determines whether the sensor data 437 is associated with an activity. If not, the operation reverts to operation block 801, the sensor processor 405 monitor the haptic device 400. If at decision block 803, the content module 423 determines that the sensor data 437 is associated with an activity, in operation block 805, the position module 421 obtains at least one predetermined distance for the associated activity from a lookup table. In decision block 807, the position module 421 determines whether an angle is associated with an obtained distance in the lookup table. If no angle is associated with a distance at decision block 807, in operation block 809, the position module 421 establishes at least one contact position and proceeds to operation block 813. If at decision block 807, the position module 421 determines that the predetermined distance is associated with an angle, in operation block 811, the position module 421 establishes at least one angled contact position and proceeds to operation block 813. In operation block 813, the position module 421 continues to monitor the sensor data and determine the position of the haptic device 400. In decision block 815, the position module 421 determines whether the haptic device 400 is at a contact position. If not, the position module 421 continues to monitor the position of the haptic device 400. If at decision block 815 the position module 421 detects the position of the haptic device 400 to be at the contact position, in operation block 817, the one or more haptic actuators 407 will provide a haptic effect.

After a contact position is established in either operation block 809 or 811, in decision block 819, the haptic device 400 determines whether a display device 445 is available. If not, the method of operation ends. If a display device 445 is available, in operation block 821, the haptic device 400 establishes a wired or wireless connection with the display device 445. In decision block 823, the content module 423 determines whether any content information is available for the determined activity. Content data may include images or text that the display device 445 may display in a user understandable arrangement. In no content information is available, the operation ends. If the content module 423 determines that content information is available, in operation block 825, the haptic device 400 will transmit the information to the display device 445.

While various embodiments have been illustrated and described, it is to be understood that the invention is not so limited. Numerous modifications, changes, variations, substitutions, and equivalents will occur to those skilled in the art without departing from the scope of the present invention as defined by the appended claims.

What is claimed is:

1. A method comprising:
   collecting, via one or more sensors of a first device, sensor data;
   determining an activity using the sensor data of the first device;
   defining, via a position module of the first device, an initial position of the first device and a distance from the initial position of the first device, the distance corresponding to the activity determined;
   monitoring a position of the first device;
   detecting the first device at a contact position, wherein the contact position is a position corresponding to the distance from the initial position of the first device; and
   producing a haptic effect, by the first device, at the contact position.

2. The method of claim 1, further comprising:
   determining, using the sensor data from at least one sensor, the initial position of the first device.

3. The method of claim 1, further comprising:
   receiving an input signal associated with the initial position of the first device.

4. The method of claim 1, further comprising:
   obtaining the distance from a lookup table value.

5. The method of claim 1, further comprising:
   outputting a control signal associated with the contact position to an actuator coupled to the first device, the control signal configured to cause the actuator to produce the haptic effect.

6. The method of claim 5, further comprising:
   calculating the speed of the first device from the initial position to the contact position; and adjusting the control signal based on the speed of the first device, thereby changing the haptic effect, wherein a first control signal produces a different haptic effect from a second control signal.

7. The method of claim 1, further comprising:
displaying, on a display of a second device, an object at a virtual position, wherein the virtual position is a position corresponding to the contact position; and
displaying the first device as an object on the second device.

8. A system for providing feedback comprising:
a wearable device having at least one portion comprising a sensor, an actuator and a transceiver for transmitting and receiving information operatively coupled to a processor operative to:
 collect sensor data associated with movement of the wearable device;
 determine an activity corresponding to the server data;
 define an initial position of the wearable device;
 define a contact position, wherein the contact position is a distance from the initial position of the wearable device associated with the activity;
 detect the wearable device at the contact position;
 provide a control signal to the actuator to produce a haptic effect in response to the detecting the wearable device at the contact position; and
a display device comprising an optical display unit, configured to display an object at the contact position, operatively coupled to a processor and a transceiver, wherein the processor is operative to:
 receive content and position data from the wearable device; and
 display visual content on a display of the optical display unit.

9. The system of claim 8, wherein a position module of the wearable device is configured to determine the initial position using sensor data.

10. The system of claim 8, wherein the processor of the wearable device is further programmed to:
 receive an input signal from the display device; and
 determine an initial position.

11. The system of claim 8, wherein the processor of the display device is a graphic processing unit.

12. The system of claim 8, wherein the processor of the available device is further operative to:
 calculate the speed of the wearable device from the initial position to the contact position; and
 adjust the control signal based on the speed, thereby changing the haptic effect, wherein a first, control signal produces a different haptic effect, from a second control signal.

13. The system of claim 8, wherein the processor of the display device is further operative to:
 display the wearable device as a first object based on the activity determined by a content module of the wearable device; and
 display a second object at the contact position corresponding to the activity determined by the content module.

14. A wearable device comprising:
a sensor;
an actuator;
a non-volatile, non-transitory memory;
a processor, operatively coupled to the actuator and non-transitory, non-volatile memory, the processor operative to:
 collect sensor data via the sensor associated with movement of the wearable device;
 determine an activity corresponding to the sensor data;
 monitor a position of the wearable device;
 detect the wearable device at a contact position associated with the activity, wherein the contact position is a position corresponding to a distance from an initial position of the wearable device; and
 provide a haptic effect at the contact position.

15. The wearable device of claim 14, wherein the processor is further operative to:
 receive an input signal associated with the initial position of the wearable device.

16. The wearable device of claim 14, wherein the processor is further operative to:
 obtain the distance from a lookup table stored in the non-volatile, non-transitory memory comprising a plurality of content entries, each entry having a corresponding distance value, wherein a content entry corresponds to determined or received sensor data.

17. The wearable device of claim 14, wherein the processor is further operative to:
 output a control signal, associated with detecting the wearable device at the contact position, to the actuator, the control signal configured to cause the actuator to produce the haptic effect.

18. The wearable device of claim 17, wherein the processor is further operative to:
 calculate a speed of the wearable device from the initial position to the contact position, wherein the speed is calculated as a ratio of the distance over a time; and
 adjust, in response to the speed, the control signal, thereby changing the haptic effect.

19. The wearable device of claim 14, further comprising:
a transceiver operatively coupled to the processor, wherein the processor is operative to connect wirelessly with a display device; and
wherein the transceiver sends position and content data to the display device.

20. The wearable device of claim 19, wherein a virtual object is output on the display device, the virtual object being at least one of a keyboard and a boxing bag.

* * * * *